Patented Oct. 4, 1938

2,132,361

UNITED STATES PATENT OFFICE 2,132,361

PROCESS OF CHLORINATING METHYL-AROMATIC COMPOUNDS

Philipp Osswald, Hofheim, and Otto Scherer, Frankfort-on-the-Main-Hochst, Germany, assignors to I. G. Farbenindustrie Aktiengesellschaft, Frankfort-on-the-Main, Germany No Drawing. Application November 26, 1935, Serial No. 51,710. In Germany December 5, 1934

6 Claims. (Cl. 260—651)

The present invention relates to methyl-aromatic compounds and a process of chlorinating them.

Hitherto these compounds have been prepared by starting from monomethyl or polymethyl benzenes and introducing chlorine preferably at a raised temperature and with exposure to light. It has been suggested to ascertain the moment when the methyl groups are completely chlorinated by determining the increase in weight or the specific gravity of the chlorination mixture.

All methods of operating previously known have shown that the chlorination occurs rather rapidly at the beginning of the chlorination but that after the introduction of about 2 chlorine atoms into each methyl group a retardation begins and the final chlorination up to the trichloromethyl stage occurs only very slowly.

We have found that the side chains of methyl-aromatic hydrocarbons of the following general formula:

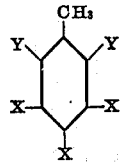

wherein one of the X's stands for $CH_3$ and the other X's and Y's stand for members of the group consisting of hydrogen, halogen, O-alkyl and $CH_3$, are chlorinated up to the trichloromethyl stage by conducting the chlorination by introduction of chlorine into the methyl benzenes at such a speed and in such a quantity that the resulting hydrogen chloride immediately after its formation is quickly dispelled by an excess of chlorine, by heating to about 150° C., suitably at a temperature of between 100° C. and 150° C. and with exposure to light. The duration of the reaction is diminished to a large extent by the large excess of chlorine, resinification and chlorination in the nucleus are entirely avoided and a very pure crude product is obtained in a practically quantitative yield.

This result could by no means be foreseen, because according to the statements in the relevant literature it was to be assumed that chlorination in the nucleus would be greatly increased by use of a large excess of chlorine. Furthermore, it was also to be expected that condensation in the nucleus and resinification would become the principal reactions owing to the large excess of chlorine used. In fact, there are obtained according to the invention, in the best yield and without any by-reactions, for instance from benzenes which are substituted by two or more methyl groups, the corresponding poly-trichloromethyl derivatives of the following general formula:

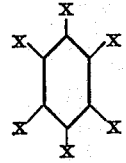

wherein two of the X's which are in meta- or para-position to one another stand for the group $CCl_3$ and the other X's may stand for hydrogen, halogen, the groups O-alkyl or $CCl_3$, that is to say, bodies which hitherto could not be made by side-chain chlorination by means of elementary chlorine. It has been found that it is of importance in the process of the invention that the portion of chlorine which at first is physically dissolved in the reagent is increased and furthermore that the hydrogen chloride formed is continuously carried away as hydrogen chloride acts as a negative catalyst. The excess of chlorine may suitably be used in the chlorination of a subsequent batch of fresh, non-chlorinated material, or it may be re-used in the chlorination of the initial batch after separation of the hydrogen chloride.

The reaction velocity of the chlorination is first increased in the usual manner by heating. The speed of the absorption of chlorine, however, reaches a maximum between 100° C. and 150° C. because at a temperature higher than 150° C. the capacity of the reaction liquid for dissolving chlorine decreases. Whilst, for instance, the chlorination of meta-xylene can be conducted at 200° C. and more without resinification, the use of such temperatures leads to a distinct decrease in the velocity of the reaction, so that the chlorination is preferably conducted at a temperature between 100° C. and 150° C.

The following examples serve to illustrate the invention, but they are not intended to limit it thereto:

(1) In a chlorination vessel provided with a condenser 424 grams of distilled meta-xylene are heated to 70° C. and a rapid current of chlorine is then introduced, whilst the contents of the vessel are exposed to the light of a mercury vapor lamp. After a short time chlorination sets in, the chlorine added is immediately consumed and the temperature rises within 20 to 30 minutes to 150° C. By suitable cooling or by regulation of the current of chlorine care is taken that the temperature does not exceed 150° C. After about three atoms of chlorine have been absorbed per molecule, the velocity of the reaction decreases and the temperature begins to fall, because the reaction becomes endothermic. External heating is applied to maintain the temperature at about 150° C. and the supply of chlorine is increased to such an extent that only one-third to one-fifth of the chlorine introduced is consumed. The waste gases, which still contain large quantities of chlorine besides gaseous hydrochloric acid, are either used for the initial stage of the chlorination of a fresh batch of meta-xylene, or they are returned to the chlorination vessel after they have been freed from hydrochloric acid by washing with water and then dried with concentrated sulfuric acid.

Depending on the rate of the supply of chlorine the absorption of 6 atoms of chlorine per molecule is complete after 3 to 10 hours. The product of the reaction solidifies on cooling to a very faintly yellowish crystalline mass of meta-xylene-hexachloride of the following formula:

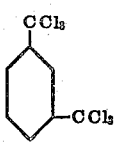

About 1200 grams are obtained, corresponding with a yield of more than 95 per cent. of the theoretical. The crude product is very pure; it can be further treated directly and has a melting point of 35° C. It distils at a temperature of 165° C. to 169° C. under a pressure of 12 mm. and after the distillation forms a white crystalline mass having a melting point of 39° C. to 40° C.

If 1-chloro-2,4-dimethylbenzene is chlorinated in the manner described in this example there is obtained the 1-chloro-2,4-bis-trichloromethyl-benzene; from 1,3-dichloro-4,6-dimethylbenzene there is obtained in like manner the 1,3-dichloro-4,6-bis-trichloromethylbenzene. In both cases, the product is obtained in a yield exceeding 95 per cent. of the theoretical. Furthermore, there may be used as starting material, for instance, also the following compounds: symmetrical meta-xylenolmethylether, 2-bromo-1,3-xylene, 2-4-dibromo-1,3-xylene.

(2) If 212 grams of para-xylene are treated in the manner described in Example 1 there are obtained about 600 grams of para-xylene-hexachloride of the following formula:

representing a yield of more than 95 per cent. of the theoretical. The crude product is obtained in the form of a faintly yellowish, crystalline mass which is very pure and melts at about 100° C. After recrystallization, for instance from benzene, it has a melting point of 109° C. to 110° C.

Chloro-para-xylene-hexachloride is obtained in a similar good yield from chloro-para-xylene. There may also be chlorinated under the above named conditions para-xylenolethylether and 2,5-dibromo-1,4-xylene.

(3) 253 grams of para-chlorotoluene are chlorinated under the conditions described in Example 1, but with the modification that the temperature of the chlorination is maintained at 125° C. The chlorination is already ended after 1 to 2 hours and there are obtained about 450 grams, that is, a yield of 97 per cent. of the theoretical, of para-chloro-benzotrichloride in the form of a colorless liquid which distils between 108° C. and 112° C. under a pressure of 10 mm.

In a similar manner there is obtained from toluene in excellent yield benzo-trichloride which distils at ordinary pressure between 212° C. and 215° C.; from ortho-chlorotoluene the ortho-chlorobenzotrichloride which distils between 117° C. and 120° C. under a pressure of 10 mm.; and from 2,4-dichlorotoluene the 2,4-dichlorobenzotrichloride which distils between 147° C. and 151° C. under a pressure of 12 mm., solidifies on cooling and has a melting point of 47° C. to 48° C.

(4) 360 grams of mesitylene are chlorinated at 150° C. in the manner indicated in Example 1. 20 to 30 hours are required for the absorption of 9 atoms of chlorine per molecule. After the chlorination is ended the product obtained solidifies and forms a yellowish crystalline mass having a melting point of 70° C. This product is mesitylene-nona-chloride (1,3,5-tri-trichloromethylbenzene) of the following formula:

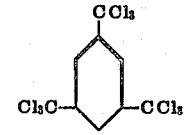

and is obtained in a yield of 1260 grams, that is, in a yield of 98 per cent. of the theoretical. After it has been purified by recrystallization or distillation it forms a practically colorless crystalline mass, which melts at 74° C. to 75° C. In a similar manner from chloro-mesitylene there is obtained, likewise in an excellent yield, the chloro-mesitylene-nona-chloride of the following formula:

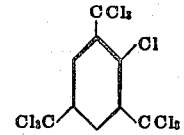

and from tribromo-mesitylene there is obtained the tribromo-mesitylene-nona-chloride of the following formula:

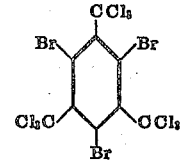

We claim:
1. The process of chlorinating the side chains of methyl-aromatic compounds selected from the group consisting of mono- and polymethyl benzenes which comprises introducing chlorine into the methyl benzenes at such a speed and in such a quantity that the resulting hydrogen chloride immediately after its formation is quickly dispelled by an escaping excess of chlorine at a temperature up to about 150° C. and with exposure to light.

2. The process of chlorinating the side chains of methyl-aromatic compounds selected from the group consisting of mono and polymethyl benzenes which comprises introducing chlorine into the methyl benzenes at such a speed and in such a quantity that the resulting hydrogen chloride immediately after its formation is quickly dispelled by an escaping excess of chlorine at a temperature between about 100° C. and about 150° C. and with exposure to light.

3. The process of chlorinating methyl-aromatic compounds of the general formula

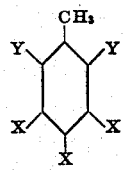

wherein one of the X's stands for CH₃ and the other X's and Y's stand for members of the group consisting of hydrogen, halogen, O-alkyl, and CH₃, which comprises introducing chlorine into the methyl benzenes at such a speed and in such a quantity that the resulting hydrogen chloride immediately after its formation is quickly dispelled by an escaping excess of chlorine at a temperature between about 100° C. and about 150° C. and with exposure to light.

4. The process of chlorinating meta-xylenes which comprises introducing chlorine into the meta-xylene at such a speed and in such a quantity that the resulting hydrogen chloride immediately after its formation is quickly dispelled by an escaping excess of chlorine at a temperature between about 100° C. and about 150° C. and with exposure to light.

5. The process of chlorinating chloro-paraxylene which comprises introducing chlorine into the chloro-para-xylene at such a speed and in such a quantity that the resulting hydrogen chloride immediately after its formation is quickly dispelled by an escaping excess of chlorine at a temperature between about 100° C. and about 150° C. and with exposure to light.

6. The process of chlorinating chloro-mesitylene which comprises introducing chlorine into the chloro-mesitylene at such a speed and in such a quantity that the resulting hydrogen chloride immediately after its formation is quickly dispelled by an escaping excess of chlorine at a temperature between about 100° C. and about 150° C. and with exposure to light.

PHILIPP OSSWALD.
OTTO SCHERER.